United States Patent Office 3,545,911
Patented Dec. 8, 1970

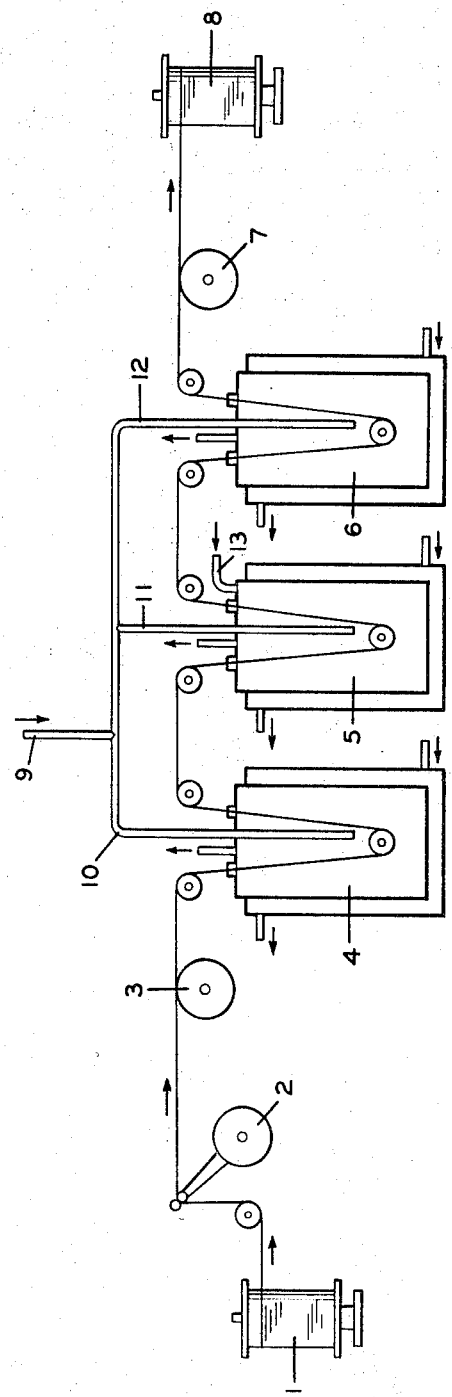

3,545,911
VAPOROUS POLYISOCYANATE TREATMENT OF NYLON SHAPED ARTICLES
Patrick V. Papero, Chester, Va., James M. Kosmala, Tonawanda, N.Y., and Maurice S. Moore, Hopewell, Va., assignors to Allied Chemical Corporation, New York, N.Y., a corporation of New York
Filed Apr. 6, 1965, Ser. No. 445,958
Int. Cl. D06p 3/24, 5/12
U.S. Cl. 8—115.5
11 Claims

ABSTRACT OF THE DISCLOSURE

A process for modification of a shaped polyamide article using an organic polyisocyanate which comprises contacting the polyamide article with organic polyisocyanate vapor at an elevated temperature of at least about 150° C. while maintaining the article under tension which prevents it retraction. The shaped polyamide article is maintained under tension and at a temperature of at least 150° C. for a period of from about 0.1 minute to about 10 minutes after the article has contacted the isocyanate.

---

This invention is concerned with treatment of shaped polyamide articles, especially continuous filaments. More particularly, it is concerned with continuous multifilament nylon yarns having improved resistance to creep, i.e. plastic flow under load, having exceptionally high tensile modulus, and having low shrinkage upon exposure to heat and boiling water, and good dimensional stability. It is concerned also with the process by which these improved yarns are prepared.

The term "nylon" herein has the usual meaning, viz a fiber-forming synthetic linear polyamide having recurring amide lingages as an integral part of the main polymer chain.

Nylon filaments such as those prepared by melt spinning the condensation product of hexamethylenediamine and adipic acid, or the polymerization product of e-caprolactam, have been and are used in many applications requiring high strength, flexibility, fatigue resistance, etc. For some applications, however, such as for reinforcing cords, for industrial belting, etc. they have shown undesirable tendency to develop a more or less permanent stretch or like distortion, especially when heated under a load. Another aspect of this same general behavior is the rather high shrinkage shown by untreated nylon when exposed in standard tests to boiling water (i.e. "boil shinkage" or "boiling water shrinkage"). Such heat treatment often reduces the tensile modulus of the filament and may unduly increase its ultimate elongation (U.E.) to break. Properties of low shrinkage together with about normal tenacity and U.E., and high tensile modulus are desirable in various textile and other yarn applications.

One problem however, in the use of nylon yarns as the reinforcing agent in elastomeric tires is that the tires so constructed have a tendency to "flat spot." This term can be explained as follows. When a tire under load is stationary, a flat spot occurs in the "foot-print" area, i.e. in the section of the tire in contact with the ground. The cords in that section will be under reduced tension due to the compression of the helical cord structure. When the tire begins rotating, the cords instantly elongate elastically by a percentage equal to their characteristic elastic recovery. Then there begins a time period where the shortened cords in the foot-print area are returning to their full normal length under the influence of centrifugal force due to the rotation, and the influence of the increased temperature which occurs. This area of plastic deformation after instantaneous elastic extension is known as "primary creep." During the period of time in which the tire yarn in the foot-print area is returned to normal length an undesirable first impression of bumpy riding characteristic is created.

This flat spotting is one manifestation of the property of plastic flow under stress, or "creep" as it is commonly called. For purpose of this description and disclosure, the extent of plastic deformation after the instantaneous elastic extension is the property which is measured as "Flat Spot Index" as below described. The time period in which the "bumpiness' may occur and is reduced to an imperceptible level is referred to hereinafter as "Run Out Time."

All man-made and synthetic fibers exhibit a similar phenomenon of plastic deformation or "flat spotting" to greater or lesser extent than does nylon.

It is a principal object of this invention to provide improved nylon filaments for such applications as above noted, and to do so by a simple and efficient process.

According to this invention a shaped polyamide article, especially a nylon article having at least one relatively long dimension in which the molecules are oriented, e.g. a sheet or filament is modified by contacting said polyamide article, especially a continuous multifilament molecularly oriented nylon yarn, with a vaporized polyfunctional organic isocyanate and keeping said article at an elevated temperature in the range from 150° C. up to the zero-strength temperature while maintaining the article under tension which prevents its retraction, for a period of about 0.1 minute to about 10 minutes after the article has contacted the isocyanate. The product of the invention is an isocyanate-modified polyamide article in which 5%–100% of the polyamide is insoluble at 22° C. in aqueous 90% formic acid; especially a continuous filament showing molecular orientation along the filament axis; having initial tensile modulus at least 20% higher than that of an untreated control filament, retaining ultimate tensile strength and ultimate elongation at least 70% of those of said control filament, having boiling water shrinkage not over 70% of that of said control filament, having primary creep not over 90% of that of said control filament, and having Flat Spot Index measured as below described of not over 80% of that of said control filament. In particular the product is a toluene diisocyanate-modified poly-e-caproamide continuous multifilament yarn, in which 5% to 95% of the polycaproamide is insoluble at 22° C. in aqueous 90% formic acid, and showing molecular orientation along the filament axis, having tensile modulus of 35–85 grams per denier, having ultimate tensile strength of 3 to 11 grams per denier, having ultimate elongation of 10–35%, having boiling water shrinkage not above about 8%, having primary creep not above about 1.3%, and having Flat Spot Index measured as below described of about 7–22. Furthermore, the invention provides reinforcing cords from said filaments of yarns for use in elastomeric articles as more particularly described below.

The preferred nylons for use in producing the filaments and yarns of this invention are polyhexamethylene adipamide and poly-e-caproamide. These are commonly known as nylon 66 and nylon 6, respectively.

Exemplary isocyanate compounds useful in this invention singly and in mixtures include polymethylene diisocyanates such as: ethylene diisocyanate; trimethylene diisocyanate; dodecamethylene diisocyanate; hexamethylene diisocyanate; tetramethylene diisocyanate; and pentamethylene diisocyanate. Also alkylene diisocyanates such as: propylene-1,2-diisocyanate; butylene-1,2-diisocyanate; and butylene-1,3-diisocyanate. Also alkylidene diisocyanates such as: ethylidene diisocyanate

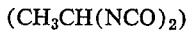

Also diisocyanato cycloalkanes such as: 1,4-diisocyanato-cyclohexane; and 1-3 diisocyanato-cyclopentane cyanate. Also aromatic polyisocyanates such as: m-phenylene diisocyanate; p-phenylene diisocyanate; 1-methyl-phenylene-2,4-diisocyanate; 1-methylphenylene-2,6-diisocyanate; naphthalene-1,4-diisocyanate; diphenyl-4,4′-diisocyanate; benzene-1,2,4-triisocyanate; xylene-1,3-diisocyanate; 4,4′-diphenylmethane diisocyanate; and 2,2-bis(p-isocyanatophenyl)propane. Also aliphatic-aromatic polyisocyanates such as: phenylethylene diisocyanates

1,2,3,4-tetraisocyanatobutane; butane-1,2,2-triisocyanate; and 2-chloro-1,3-diisocyanatopropane.

Benzenoid isocyanates are preferred because of their low toxicity and of these 1-methyl-phenylene-2,4-diisocyanate commonly known as toluene diisocyanate or TDI is most preferred since it is readily available in commerce, and its use provides isocyanate modified fibers of high quality.

Reaction between the nylon and the vaporized isocyanate is effected upon continuously running yarn at an elevated temperature while keeping sufficient tension on the yarn to maintain substantially constant length. Carrying out the reaction on running yarn is convenient and by our process produces uniform results. Uniform results are not achieved when the yarn is exposed on a package to the isocyanate. We have discovered that the desired properties are not retained in the final product unless the reaction is carried out while the filament is under tension sufficient to maintain substantially constant length. Vapor phase operation has been found essential in obtaining the present products, perhaps because when temperatures are high enough to obtain rapid reaction, the isocyanates in liquid-phase tend to dissolve the polyamide thus destroying its molecular organization needed to retain the desired strength, ultimate elongation, etc., and to undesirably fuse the individual filaments together.

The process of the invention will be better understood by reference to the accompanying drawings in which the single figure schematically illustrates the process.

Drawn, molecularly oriented nylon yarn is continuously pulled from a supply package 1 over a tension regulator 2 and a feed roll 3 to a preheat tank 4 kept at a sufficiently high temperature to adjust the yarn temperature to within at least 50° C. of the reaction temperature. If desired instead of preheat tank 4, there may be used a surface contact heater, a radiant heater, an infrared heater and the like. Alternately, tank 4 may be omitted. The yarn is then led under tension which prevents retraction of the yarn into a tank 5 containing the vapor of the selected isocyanate, admitted as a liquid or vapor via inlet 13, entrained with an inert gas such as nitrogen at a temperature in the range from about 150° C. to the zero-strength temperature of the yarn under tension. For polycaproamide yarns, the preferred temperature is between 200 and 215° C. The residence time is not over 2.5 minutes in this contacting zone, and more preferably from 0.1 minute to 1.0 minute.

The selected isocyanate can suitably be vaporized with heated nitrogen gas passed through a 65 micron porous sparger into a column of diisocyanate maintained at 150–220° C. by suitable means. The yarn thus treated is next conducted to a curing tank 6 where the reaction with absorbed isocyanate is completed. The temperature in this curing zone is preferably within 25° C. of the zero-strength temperature of the yarn, to minimize reaction time needed. For polycaproamide yarns the preferred temperature is 205–217° C. The reaction time allowed therein is desirably about 0.1 minute to 2.5 minutes, especially about 0.1 minute to 1.0 minute. Thus desirably the total time of exposure to temperatures of 200° C. up is between about 0.2 minute and about 5 minutes. If a catalyst is used in the curing zone, the reaction time will be minimized.

From the last heating zone, the yarn is guided over a pull roll 7 to a take-up roll 8. It shows a slight weight increase, not over 10%, attributable to reacted isocyanate.

Desirably an inert gas such as nitrogen is supplied via pipe 9 and branches 10, 11, 12 to tanks 4, 5, and 6, respectively. The use of an inert atmosphere such as nitrogen is not essential but aids in minimizing side reactions.

As aforesaid, the yarn is kept under tension to maintain substantially constant length during the reaction. For most yarns, a tension of the order of from 0.2 to 1 gram per denier is sufficient to substantially prevent retraction. However, tensions appreciably above or below this range will occasionally be employed. Preferably, for yarns such as textile yarns requiring good dye uniformity, tensions are maintained with a change no greater than 0.3 g./d. tension during the reaction.

It may be noted that the no-strength or fusion temperature of the nylon is usually higher when the yarn is under tension than when it is allowed to relax. This is apparently because tension resists the tendency of the molecules, oriented along the filament axis, to become disorganized. The preservation of molecular organization may contribute to the good retention of properties in yarns treated by the process of this invention; however we do not intend to be bound by theories.

The degree of crosslinking which is obtainable is a time temperature function and at constant temperature it is controllable by the residence time employed. As an example using polycaproamide yarns at a temperature of 217° C. in both the reactor zone 5 (Refer to FIG. 1), and in the curing zone 6 at a total residence time in seconds of 54, 30, 25, 23, 20, and 17, the corresponding insolubility in aqueous 90% formic acid (indicative of the degree of crosslinking), was respectively 100%, 75%, 50%, 25%, 10% and 5%.

The reaction which takes place between the nylon and the polyisocyanate is believed to be one of crosslinking by reaction of isocyanate groups at random adjoining sites along two adjacent linear molecules of polyamide. Terminal groups on the polyamide can also react with the isocyanate. Unexpectedly 70% or more of the tenacity and ultimate elongation of the original yarn is retained in the reaction. Generally crosslinking of nylon, for example with formaldehyde, results in much greater loss in tenacity and ultimate elongation.

TESTS

A laboratory test has been devised which subjects a yarn sample to standardized conditions of a heat and load, giving a measurement which can be designated the "Flat Spot Index." A low Flat Spot Index is an indication of good resistance to creep. Flat Spot Indices in the tire yarn appreciably above 18 when these yarns are converted to 2 and 4 ply tires and road tested are above the roughness perception level and are generally undesirable. The modified poly-e-caproamide yarns of this invention have Flat Spot Indices of from about 7 to 22 and do not increase appreciably above 22 even when tested at relative humidities as high as 90% or higher.

The test is carried out as follows:

The thermal history, mechanical conditioning and moisture content of a yarn will influence creep properties. Accordingly, the following procedure is used to prepare all specimens for testing. An atmosphere of dry inert gas is maintained in the oven during the entire conditioning and testing periods. For most testing purposes, relative humidity is maintained at less than 5% although to determine the effect of relative humidity, this value can be varied.

(1) Suspend two 20" specimens of a yarn sample in the oven (a glass tube jacketed for heating by steam), at room temperature.

(2) Apply a 0.5 g./d. load to each yarn and heat to 105° C. Maintain temperature and load for one hour.

(3) Cool oven to room temperature and increase load to 0.75 g./d.; hold for 30 minutes.

(4) Heat oven to 105° C.; hold for one hour; then cool to room temperature and hold for 30 minutes.

(5) Reduce load on each yarn to 0.50 g./d. and heat oven to 105° C.; hold for 16 hours; then cool to room temperature and hold for 30 minutes.

The conditioned specimens are tested as follows:

(6) Heat oven to 105° C.; hold for 20 minutes.

(7) Reduce load on one specimen (yarn B) to 0.25 g./d.; hold for 5 minutes; then cool oven to room temperature (about 20 minutes).

(8) Increase load on yarn B to 0.5 g./d. Observe length of specimens after 30 seconds.

The length differential between the two specimens after reapplication of load in step (8) represents a measure of creep after heating. The Flat Spot Index is taken as the differential length expressed in millimeters, multiplied by ten. By this method, ordinary nylon 6 yarns have a value of about 30–32.

The degree of crosslinking of nylon yarns is determined in a laboratory test which involves placing thin microtomed cross sections of the yarn in aqueous 90% formic acid at a temperature of 22° C. The proportion of the yarn which is insoluble in the aqueous 90% formic acid is a direct measure of the degree of crosslinking. By staining the cross sections with Lanamid Red 3 BS dye, (Acid Red 182) the width of the undissolved annulus forming an outer skin on the yarn filaments can be clearly observed, and compared with a drawing showing cross sectional annuli in 10% area increments. In this manner the percentage of undissolved polyamide is directly estimated and this is considered to be directly proportional to the percent of crosslinking.

The H adhesion test employed, herein, is essentially the same as ASTM Standards for 1964 D2138–62T, vol. 28, pp. 992–996; which is the standard H adhesion test for two ply cords. The dipped and tensilized cord is placed between 2 layers of natural rubber stock in a mold with the cord under a tension of 50 grams. The sandwich assembly is vulcanized in the press for 30 minutes under a 250 p.s.i. load. In the test method, the force in pounds is measured for pulling in an axial direction, one test cord from the laminate of rubber with a ¼" length, therein, said laminate being maintained at 250° F.

EXAMPLES

In an especially preferred aspect of this invention the nylon 6 yarn is stabilized against heat with a copper salt soluble in the polymer, i.e. completely dispersed without substantial dulling effect at the concentrations of the copper salts used, viz. about 10–100 parts as copper per million parts of polymer. Many organic salts such as the adipates and acetates are suitable at these concentrations as are several inorganic salts such as the chlorides. Whatever the selected salt, it is used at concentrations of the copper component of about 10 to 100 parts per million parts of polymer. The yarns, e.g. those intended for textile use can contain other metal salts, e.g. manganous salts for purposes of light stabilization, etc.

Products prepared using these yarns have remarkably low "Flat Spot Index." The yarns and products made therefrom have typically about 0.5% to 1.3% primary creep. Yarns of this invention have low creep over a range of relative humidities from as low as 5% to as high as 90%. Other yarns often show high values of creep at high relative humidities.

The yarns can contain various lubricants, pigments, and other additives. It has also been found that certain organic heat stabilizers, for example aromatic amine/ketone condensation products, can be present in yarn to be treated by our process.

An especially valuable aspect of this invention is the production of partially crosslinked yarns (10, 25, 50, 95% crosslinked) which exhibit a crosslinked outer annulus or skin and a non-crosslinked flexible nylon core. Such yarns when crimped are similar in character to wool in crimp resilience, crimp retentiveness, and elastic elongation. For example, the yarn is crosslinked, then crimped, e.g. in a stuffing box to form angular crimps. The crimped crosslinked yarn will be given a crimp level of 10 to 16 crimps per inch and a crimp elongation, after boil, of 15 to 40%. These yarns are put into a structure, such as tufted, frieze or cut pile carpets. Alternately woven and knit goods can be crosslinked when in the final fabricated form. The mode of operation should be such, that the yarns are maintained under a suitable tension during the crosslinking process.

The fibers of this invention are eminently suited for use in the reinforcement of polymer compositions, particularly polycaproamide; and more particularly polycaproamide produced by anionic polymerization. It is especially preferred to incorporate the fibers in an anionic polymer by suspending the fibers in e-caprolactam and catalyzing the polymerization by anionic systems such as those disclosed in U.S. Pat. 3,017,391, dated Jan. 16, 1962, to E. H. Mottus et al. and Belgian Patent 623,840, dated Sept. 11, 1962, to E. W. Pietrusza et al. In such uses the crosslinked fibers are preferably employed in the form of short lengths or floc, e.g. having an average length of about ¼ inch. After the fibers are blended into the e-caprolactam, the mixture can be poured into any suitable stationary or rotating mold or can be formed by extrusion or otherwise shaped while polymerization proceeds.

The fibers of this invention, in woven or nonwoven form can be employed as a substrate upon which graft polymerizations of e-caprolactam or other monomers are carried out.

The following nonlimiting examples are illustrative of the invention and sets forth the best modes we have contemplated of practicing our invention.

Example I

A drawn, molecularly oriented 480 denier, 136 filament nylon 6 yarn was employed containing the usual small amount of hot water extractables (caprolactam, dimers and trimers thereof), about 40 p.p.m., of copper as $CuCl_2$ and organic heat stabilizer, viz. 0.6% by weight of high temperature, high pressure diphenyl amine/acetone condensation product after-reacted with formaldehyde, described at col. 4, lines 22–35 of U.S.P. 3,003,995 of Oct. 10, 1961 to E. C. Schule. When under tension preventing its retraction this yarn had zero-strength temperature of about 220° C.

This yarn was treated at 100 feet per minute using the procedure and apparatus above described with reference to the drawing. The yarn was contacted by vapors of 2,4-toluene diisocyanate at a temperature of about 205° C. and was then advanced to the curing zone where the yarn was maintained at constant length at a tension of 0.67 gram per denier at a temperature of 210° C. The residence time of the yarn in the curing zone was 50 seconds.

The properties of the treated yarn thus obtained in comparison with the properties of the control (i.e. the yarn prior to treatment) are presented in the Table I below.

In Table I below, the creep tests were determined at a temperature of 25° at 10% relative humidity and at a one gram per denier loading.

TABLE 1

| | Polycapro-amide yarn control | Polycapro-amide yarn crosslinked |
|---|---|---|
| Example No | | 1 |
| Percent crosslinked | 0 | 100 |
| Ultimate tensile strength, grams per denier | 8.3 | 7.4 |
| Percent ultimate elongation | 17.2 | 14.9 |
| Initial tensile modulus, grams per denier | 41.0 | 55 |
| Boiling water, percent shrinkage | 13.0 | 4.7 |
| Flat Spot Index | 32.0 | 14.1 |
| Creep loading change,[1] percent elongation in 0-30 minutes | 3.5 | 3.0 |
| Creep immediate elastic recovery,[2] percent retraction in 0-.01 minute | 1.4 | 1.7 |
| Primary creep recovery,[2] percent retraction in .01-30 minutes | 1.5 | 0.6 |
| Permanent creek,[3] percent elongation | 0.6 | 0.7 |

[1] Change (percent elongation) after 30 minutes exposed to a one gram per denier load.
[2] After 1.0 gram per denier load removed.
[3] The permanent creep is the permanent elongation of the specimen remaining after a loading and unloading cycle of 30 minutes at 1 g./d. load and 30 minutes unloaded.

The data in Table I represent the average of a large number of samples (determined by standard methods except for Flat Spot Index, determined as above outlined). The tensile properties were determined on an Instron tester.

Other nylon yarns, such as specifically nylon 66 yarn, when substituted for the nylon 6 yarn in the general procedure of this example acquire generally similar improvements of properties. Other polyamide shaped articles such as films can also be improved in properties, especially creep and shrink resistance and tensile modulus, by the general process of this invention.

Although for convenience and for greatest uniformity of results, a yarn or other extruded profile treated by our process should be continuously running, and preferably at substantially constant speed, it is possible to obtain at least some of the advantages of our invention by exposing to polyisocyanate vapors a molecularly oriented nylon shaped article having at least one relatively long dimension in which the molecules are oriented, e.g. a filament, a strip, a sheet, or a film while the article is held stationary; provided molecular orientation in the long dimension is maintained in the article by maintaining the artcle under tension in the direction of the molecular orientation thereby resisting contraction in that direction which would occur in the absence of tension at the temperatures employed in the treatment, viz. temperatures in the range from at least 150° C. up to the zero-strength temperature of the article.

In penetration tests with 0.5 mil nylon films under tension in the direction of the molecular orientation and containing a sensitive toluene diisocyanate indicator (malachite green plus butyl amine), the following diffusion rates were observed:

Temperature °C.: Time to penetrate 0.5 mil nylon films in minutes
120 _____ 14
150 _____ 7
200 _____ 3.4

The service characteristic of the film can be controlled by the depth to which it is crosslinked in accordance with this invention.

Example II (A). The crosslinked yarns of this invention which are 5–100% insoluble in aqueous 90% formic acid can be fabricated into tensilized tire cords which shows the following improved properties: A flat spot index from 18–24 which is not over 80% of that of a tensilized control cord made from untreated polycaproamide yarn, an adhesion to rubber substantially that of said control cord, a shrinkage when exposed to temperatures of 375° F. of between 10–13% which is at least 10% less than that of said control cord, an initial tensile modulus of between 27–45 grams per denier which is at least 15% greater than that of said control cord, and ultimate tensile strength or breaking strength between 6.0 and 10 grams per denier which is at least 70% of that of said control cord. The procedure was as follows:

Two ends of 840 denier 136 filament yarn produced by the procedure of Example I were individually twisted 12 turns per inch in a Z direction. Then the individual ends were combined and twisted in a S direction for 12 turns to form a 2 ply greige tire cord of 12S x 12Z turns per inch construction.

The greige cord was then passed through a resorcinol formaldehyde latex dip, and then tensilized in a single end Litzler tensilization apparatus employing process conditions as shown in Table 2.

TABLE 2

| Unit operation | Pull roll speed, y.p.m. | Pounds tension on cord | Gas temperature surrounding the cord | Exposure time, sec. |
|---|---|---|---|---|
| Dipping | 20.6 | | Ambient | |
| Drying | 20.6 | 4 | 275° F | 320 |
| Hot stretching | 21.2 | 6 | 325° F | 20 |
| Normalizing | 21.2 | 5 | Room temperature | 60 |

The tire cord produced according to the above tensilization conditions were evaluated and compared with a control polycaproamide yarn tensilized under optimum conditions for this cord type. The comparative cord properties are shown in Table 3.

In Table 3, it can be seen that the crosslinked tensilized tire cord exhibited significantly improved tensile modulus, flat spot index and resistance to 375° F. thermal shrinkage over the control tensilized polycaproamide cord and still retained the outstanding strength, adhesion and fatigue properties characteristic of nylon tire cords.

TABLE 3

| | Control polycapro-amide tensilized cord | 100% crosslinked polycapro-amide tire cord |
|---|---|---|
| Example No | | 2 |
| Breaking strength, pounds | 29.6 | 29.5 |
| Ultimate tensile strength, grams per denier | 7.15 | 7.12 |
| Percent elongation at break | 21.2 | 17.7 |
| Initial tensile modulus, grams per denier | 24.4 | 29.1 |
| Flat Spot Index tensilized cord | 33 | 22 |
| Flat Spot Index in rubber, 10% relative humidity | 37 | 28 |
| ¼ inch "H" adhesion (pounds in rubber) [1] | 12.2 | 11.8–13 |
| Percent shrinkage at 375° F | 14.0 | 11.8 |
| Tube fatigue Goodyear Test, minutes to break | 577 | 520 |
| Fatigue Goodrich Disk, percent strength loss | 16.1 | 16.5 |

[1] See col. 5, line 53.

(B) The 12 x 12 twist tensilized tire cord of Tables 2 and 3 were used in construction of 4 ply experimental tires. The single ends were laid up on .016" greige 100% natural rubber gum at 24 ends per inch and calendered using conventional methods. The calendered fabric was cut to proper dimensions to produce 750–14, 4 ply bias tires and fabricated into experimental tires using standard production beads, chafers and inner liner. Treads were extruded and the experimental tires were cured in a "Premium Miracle" mold for a period of 30 minutes at a temperature not exceeding 310° F. All experimental tires were post cure inflated at 50 p.s.i. air pressure on manual post inflation stands. The experimental tires were evaluated in dynamic flat spot tests made by running a balanced tire, mounted on the front axle of an automobile, against a motor driven 18 inch diameter steel drum. The test car was a 1963 Ford Fairlane Sedan. The test load was a normal front axle road weight. The test tire was warmed up in the following sequence: 5 minutes at 22 miles per hour (m.p.h.), 5 minutes at 48 m.p.h. and 10 minutes at 58 m.p.h. The flat spot was developed by allowing the weight of the car to stand 105 minutes, and allowing the tire to cool within 1 p.s.i. of the initial cold inflation pressure. The runout time was determined by running at 22 miles per hour average speed. The vertical acceleration (bounce) of the front axle was recorded using an accelerometer and oscillographic equipment. The peak to peak accelerations are expressed in units times gravity. The results of these tests are summarized in Table 4. Crosslinked polycaproamide results are compared with 4 ply tires produced with non-crosslinked polycaproamide and polyhexamethylene adipamide tire cords of similar construction.

In the practical dynamic flat spot test, the following definitions apply:

Flat spot severity is measured as the peak to peak acceleration (bounce of the automobile front axle) determined 0.5 minute after starting the runout portion of the test using an accelerometer.

Tire noise is the peak to peak acceleration (bounce) of the tire caused by normal manufacturing irregularities which is determined at the end of the tire runout cycle as determined with an accelerometer.

Flat spot run out is the distance in miles until the tire reaches an imperceptible bounce level as determined by a panel jury test.

Non-objectional run out equals miles for the flat spot to be reduced to a non-objectionable level by subjective tests of a panel of experts.

The panel jury tests were run using a tire warm-up distance of 50 miles at 60 miles per hour turnpike driving. Cooling period times of 3¾ hours and 17½ hours were employed. A run-out speed of 30 miles per hour was used. The test vehicle was a 1964 Ford station wagon for the panel jury test.

From Table 4, it can be observed that 100% crosslinked nylons of this invention exhibit a significant reduction in the flat spot severity and run out times, each being not over 80% of those of a control tire made from untreated polycaproamide cords. At the same time, the excellent low noise characteristics of nylon were maintained at substantially the same level as for said control tire. The beneficial effects from crosslinked nylons were most noteworthy in 4 ply tire tests and while beneficial with 2 ply tires, were less marked due to the greater flexibility of a 2 ply tire carcass and its ability to flex and absorb the shocks caused by irregular road surfaces.

TABLE 4

|  | Tires from polycaproamide control | | Tires from polyhexamethylene adipamide control | | Crosslinked polycaproamide | |
|---|---|---|---|---|---|---|
| Percent crosslinked yarn | 0 | | 0 | | 100 | |
| Tire size | 750 x 14 | | 750 x 14 | | 750 x 14 | |
| Tire construction, plies | 4 | 2 | 4 | 2 | 4 | 2 |
| Flat spot severity, peak to peak×gravity | 1.82 | 1.16 | 1.78 | 1.22 | 1.35 | ¹.93 |
| Flat spot nonobjectionable run out, distance in miles | 1.0 | 0.5 | 1.4 | 0.7 | .80 | ¹.4 |
| Number of observations made ² | 20 | 20 | 8 | 24 | 8 | |
| Flat spot run out, total distance miles detectable | 3.6 | 1.7 | 3.7 | 1.7 | 1.8 | ¹.85 |
| Tire peak to peak noise level | .35 | .25 | .53 | .31 | .38 | ¹.27 |

¹ Data interpolated based on the 4 ply tire test.
² Number of observations made in jury test of run out distance in miles non-objectionable and flat spot run out total distance detectable.

Examples 3, 4, 5, 6, 7, 8, 9, 10

A series of industrial grade crosslinked polycaproamide yarn was prepared as described in Example I using an apparatus as shown in FIG. 1, except that only two tanks were employed. The yarn guide bearings in the reaction tank and in the curing tank were stainless steel roller bearings lubricated with a light oil lubricant fog prior to starting the unit in operation. This gave a low torque and low and uniform tensions across the reactor and curing zone. Uniform tension is important in the crosslinked yarn quality and uniformity.

2,4-toluene diisocyante was vaporized from a carburetting device consisting of 1½″ inside diameter x 30 inch long jacketed tube containing 28″ of 2,4-toluene diisocyanate as a column of liquid. Nitrogen gas was sparged into the base of the polyisocyanate liquid column through a 65 micron sparger, to entrain the polyisocyanate with fine nitrogen bubbles into the bottom of the first reaction zone where the entrained isocyanate vapor contracts the 840 denier, 136 filament, 1 turn per inch, Z twist yarn. The temperature of the first reaction zone FIG. 1 (5) was maintained at 215° C. and then the yarn was passed into the curing zone FIG. 1 (6) where the temperature was also maintained at 215° C. The total yarn residence time was varied between 12 and 60 seconds with the time divided equally between the reaction zone 5 and the curing zone 6. The yarn tension was maintained uniformly at .54 gram per denier. The reaction zone and curing zone each held 52 feet of yarn for total length of yarn in the two zones of 104 feet.

A series of crosslinked high tenacity yarns were produced, where the degree of "skin" formation or closslinking was a function of and controllable by the yarn residence time. The skin was measured by microtoming and dyeing as above outlined under "Tests." The properties of the treated crosslinked yarn are compared in Table 5. It was found that the yarns showing 100% and 25% crosslinking were molecularly oriented along the filament axis as determined by X-ray.

From the Table 5, it can be observed that the properties of crosslinked polycaproamide yarns of this invention are substantially the same when the crosslinking is from 5 to 100%.

There is a significant decrease in the primary creep, flat spot and boiling water shrinkage, and there is a significant increase in the initial tensile modulus and elastic elongation as compared with non-crosslinked polyamide yarn.

Useful elastomeric articles reinforced with tensilized and nontensilized crosslinked cords and yarns of the invention said crosslinked fibers being between 5 and 100% insoluble in aqueous 90% formic acid are tires, conveyor belts, drive belts and pressure hose.

TABLE 5.—POLYCAPROAMIDE PROPERTIES EXPOSED TO DIFFERENT DEGREES OF CROSSLINKING

|  | Non-crosslinked control | Crosslinked polyamide | | | | | | | |
|---|---|---|---|---|---|---|---|---|---|
| Example No. |  | 3 | 4 | 5 | 6 | 7 | 8 | 9 | 10 |
| Total yarn residence time in seconds in reaction zone and curing zone | 60 | 54 | 30 | 26 | 24 | 20 | 17 | 12 |  |
| Percent crosslinked |  | [1] 100 | [2] 100 | 75 | 50 | 25 | 10 | 5 | [3] |
| Yarn speed in feet per minute |  | 104 | 115 | 208 | 240 | 260 | 332 | 368 | 520 |
| Ultimate tensile strength in gm./den | 8.3 | 6.9 | 7.4 | 7.7 | 7.6 | 7.9 | 7.9 | 7.7 | 7.4 |
| Ultimate elongation, percent | 17.2 | 15.0 | 14.9 | 16.7 | 16.1 | 16.4 | 15.3 | 15.4 | 15.1 |
| Initial tensile modulus, gm./den | 41 | 61 | 55 | 54 | 54 | 50 | 53 | 52 | 49 |
| Flat spot index, yarn | 28 | 14.0 | 15-16 | 16 | 17 | 18 | 20 | 22 | 23 |
| Flat spot index, tensilized cord | 33 | 21 | 22 |  |  |  |  |  |  |
| Boiling water shrinkage | 13 | 5.0 | 5.0 | 7 | 7 | 7 | 7 | 8 | 7 |
| Yarn creep immediate elastic recovery, see Table I | 1.4 |  | 1.7 |  | 1.4 |  |  | 1.5 |  |
| Yarn primary creep recovery, see Table I | 1.5 |  | 0.6 |  | 3.0 |  |  | 1.3 |  |
| Tensilized cord primary creep recovery, see Table I [4] | 2.0 |  | 1.48 |  |  | 1.7 | 1.8 |  |  |

[1] Crosslinked to 100% insoluble in formic acid then additionally to the point where the filaments are uniformly crosslinked from the outside to the center as shown by uniform slight swelling upon soaking in formic acid.
[2] Crosslinked to 100% insoluble in formic acid but when soaked in formic acid the control core swells to greater extent than does the outer annulus.
[3] Fragments.
[4] Tensilized cord 2 ends/840 denier 136 filament 12S and 12Z turns per inch, see Table I.

Examples 11, 12, 13, 14

A series of 840 denier, 136 filament textile grade yarns were prepared as described in Examples 3–10 except as otherwise indicated in Table 6 below. The crosslinked yarns thus prepared were knitted into fabric and their textile properties were evaluated.

The yarns and fabrics thus produced possessed a range of useful and valuable textile properties, as shown in Table 6 below.

Among the useful textile properties found were high initial modulus of 35–85 gms./den. which is at least 15% higher than that of an untreated control yarn; and high wet modulus of 50–100 gms./den. which is at least double that of said control yarn. This yarn is suitable for production of staple fibers to be blended with cotton. These high modulus properties also improve the utility of this polycaproamide yarn for production of textured carpets with improved stiffness, pattern definition and resilience.

The low boil shrinkabe of 4–8% obtained and improved dimensional stability and low yarn retractive forces such as 0.5 gram per denier at 375° F. are useful in filling yarns for woven fabrics.

The low water absorption properties are useful in quick drying fabrics. The water absorption after 24 hours at 65% relative humidity is at least 10% less than that of an untreated control yarn.

The high initial tensile modulus and improved immediate elastic elongation are useful in the production of textured and stretch fabrics.

The range of dyeing shades obtained for different proportions of "skin" permits mixtures of yarns having like properties except for dye tone, whereby tone on tone dyed articles, e.g. fabrics and textured carpets, and staple fibers (nylon 6 and crosslinked nylon blends) from which heather type suiting fabrics can be produced. Textiles of this invention have application where they must retain their physical shape at high temperatures. 100% crosslinked nylon of this invention retains its shape up to 280° C. whereas unmodified nylon 6 loses its shape and melts at a temperature of 228°–230° C.

Textile fabric yarns of this invention show a marked reduction in sound transmission when compared with non-crosslinked polyamides.

1200 denier 70 filament yarns are crosslinked in a similar manner similar to Examples 3–10. Crosslinked yarns have similar properties to the 840 denier 136 filament. The yarns with various degrees of between 5–100% crosslinking were passed through a steam chamber maintained at 150° C., then through a stuffer box crimper at 1800 feet per minute and finally through a crimp removal zone, utilizing a process similar to that described in U.S. 3,031,734 (H. J. Pike, Jr. assigned to Allied Chemical Corporation). The isocyanate modified crimped yarns had 12 to 14 crimps per inch and crimp elongation of 25 to 34% and a shrinkage of 6 to 10%.

In another trial, 1200 denier 70 filament 0 twist yarns are crosslinked to between 5–100% insoluble in aqueous 90% formic acid, as described in Examples 3–10; the properties are similar to the textile isocyanate modified yarns of Table 6.

TABLE 6

| Example No. | Nylon 6 control | 11 | 12 | 13 | 14 |
|---|---|---|---|---|---|
| Percent crosslinked | 0 | 100 | 50 | 25 | 10 |
| Yarn residence time in seconds, reaction zone and curing zone |  | 54 | 26 | 24 | 20 |
| Ultimate tensile strength, grams per denier | 8.3 | 7.4 | 7.6 | 7.9 | 7.9 |
| Initial tensile modulus, gms./den | 41 | 54 | 54 | 50 | 53 |
| Boiling water shrinkage, percent | 13.0 | 5.0 | 7.0 | 7.0 | 7.0 |
| Wet modulus, gms./den | 20 | 65–90 |  | 65–90 |  |
| Yarn creep immediate elastic recovery, 0–.01 minute (see Table I), percent | 1.4 | 1.7 |  |  | 1.5 |
| Yarn percent moisture absorbed [1] | 2.56 | 1.94 |  | [2] 2.1 | [2] 2.2 |
| Yarn retractive force in grams at 375° F | 500 | 400 |  |  | 475 |
| Percent dyeability | [3] 100 | [4] 60–70 |  | [2] 70–80 |  |
| Optical melting point of polymer flow, ° C.[5] | 228–230 | 280 |  | [2] 250 |  |
| Yarn density, gms./cc | 1.138 | 1.156 |  |  |  |
| Dye streaks tension range [6] |  | [7] |  |  |  |
| Dye streaks tension range [8] |  | [9] |  |  |  |

[1] 24 hours exposure at 65% relative humidity.
[2] Data interpolated.
[3] Dye strength obtained for control nylon 6.
[4] Dye shade appreciably yellower than (3).
[5] The temperature at which the round filament loses its shape and flows when observed on the heated stage of a microscope.
[6] Carbon steel sleeve bearings grease lubricated for yarn guides at .4–.9 gram per denier tension range across the reactor train.
[7] Extensive.
[8] Stainless steel ball bearings light mineral oil lubricated at start for yarn guides; 0.3–0.6 gram per denier yarn tension range over reactor train.
[9] Equal to standard nylon 6.

The crosslinked samples are then passed over a contact preheater to adjust the yarn temperature to 100–130° C., thence at a speed of 3000 feet per minute to a narrow crimp zone where the yarn is contacted with steam at 60° angle at a steam pressure of 120 p.s.i.g. and a steam temperature of 225° C. The yarn is thus plasticized and impelled at high velocity against a slowly moving plug of yarn to produce a 3-dimensional random crimped yarn of 12 to 14 crimps per inch. Two ends of textured isocyanate modified multifilament yarns produced as described above by stuffer box crimping and steam jet bulking are plied together to form 2400 denier 140 filament yarn and then tufted into carpets to produce a product with excellent resiliency, crimp retention, and pattern definition.

The textured isocyanate modified yarns have a similar pleasant loft and hand to wool, when converted to carpets, worsted fabrics, and upholstery. In the above described products, the isocyanate modified textured yarns were superior to non-modified polyamide yarns textured in a similar manner.

140 denier 24/½ Z filament polycaproamide yarn containing .4% titanium dioxide as a delustrant are crosslinked in a process like that described in Examples 3–10. The crosslinked yarns thus produced had properties in general corresponding to that shown in Table 6.

These crosslinked yarns are then fed to a Leesona Superloft 553 machine and false twisted at a 6% bottom overfeed and a 5% top feed. The isocyanate modified yarns are passed over a 27½" contact heater maintained at 205° C. to set the twist. A twist of 54 turns per inch at a spindle speed of 195,000 r.p.m. is employed. The false twist yarns thus produced are then thrown and woven into worsted 8.5 oz./yd.² stretch fabric.

The false twist bulked stretch fabrics made from isocyanate modified yarns have excellent crimp retention, high bulk and a warm, wool-like handle of exceptional resilience as compared with non-modified polyamide yarns treated in a similar manner.

Examples 15, 16, 17, 18, 19, 20

A series of polyisocyanates were reacted to demonstrate the broad application of this technology of crosslinking polyamides yarns under tension with polyisocyanates in the vapor phase.

Of the series tested, 2,4-toluene diisocyanate, with an acidity (as HCl) below .001% was found most controllable although other polyisocyanates were found to be more reactive.

Certain physical properties of the isocyanates tested, and characteristics of the crosslinked yarns made therefrom, are given in Table 7.

TABLE 7

| Example No. | 15 | 16 | 17 | 18 | 19 | 20 |
|---|---|---|---|---|---|---|
| Trade name [1] | Nacconate 100 | Nacconate 40 | Nacconate 300 | Nacconate 80 | --- | Nacconate 200 |
| Source [2] | 2 | 2 | 2 | 2 | --- | 2 |
| Chemical Name [1] | 2,4-toluene diisocyanate | Meta-phenylene diisocyanate | Diphenylmethane 4,4'-diisocyanate | Mixed 2,4- and 2,6-toluene diisocyanate | 1,5-naphthalene diisocyanate | Bitoluene 4,4'-diisocyanate |
| Boiling point [1] | 120° C. (10 mm. Hg) | 180° C. (200 mm. Hg) | 194–199° C. (5 mm. Hg) | 120° C. (10 mm. Hg) | 210 | 198–200° C. (3 mm. Hg) |
| Molecular weight [1] | 174.2 | 160 | 250 | 174.2 | 130° C. | 69.6° C. |
| Solidification Point [1] | 22° C. | 51–55° C. | 37° C. | 12° C. | | 600 |
| Reaction time, sec. to 100% crosslinked | 40 | 24 | 180 | 60 | | |
| Reaction temperature | 215° C. | 204° C. | 215° C. | 215° C. | | 215° C. |
| Tensile strength, gms./den.[3] | 7.4 | 6.6 | 6.8 | 7.2 | 6.8 | 6.8 |
| Ultimate elongation [3] | 14.9 | 13.0 | 13.5 | 14.0 | | |
| Initial tensile modulus [3] | 61 | 66 | 50 | 55 | 50–60 | |
| Flat Spot Index [3] | 15–16 | 12 | 14 | 16 | 12–14 | |
| Boil shrinkage [3] | 5.0 | 5.5 | 5.0–6.0 | 6.0 | | |
| Tendency of filaments to fuse together due solvent action of the indicated temperature.[3] | Minor | Considerable | Minor | Minor | | |

[1] Properties of isocyanate employed.
[2] Allied Chemical Corporation, National Aniline Division, 40 Rector St., New York, N.Y.
[3] Properties of 100% crosslinked polycaproamide fibers.

We claim:
1. In a process for modification of a synthetic linear polyamide filament, strip, sheet, film or yarn by contacting said polyamide with the vapor of a polyisocyanate monomer, the improvement comprising:
contacting said polyamide in a molecularly oriented state with said vapor
at a temperature of from about 150° C. to the zero-strength temperature of the article
in two contacting zones
for a total time of from about 0.1 to 10 minutes
under tension in the direction of molecular orientation sufficient to prevent retraction of said polyamide
so that said polyamide is crosslinked substantially only on the outer surface.

2. The process of claim 1 wherein the process is continuous and the article is a continuous multifilament yarn.

3. The method of claim 1 wherein said article is first contacted with said vapor at a temperature of from about 200 to about 215° C. for from 0.1 to 2.5 minutes, then cured at a temperature of within 25° C. of the zero-strength temperature for a period of 0.1 to 2.5 minutes, under a tension in both the initial contact zone and the cure zone of about 0.2 to 1 gram per denier.

4. The process of claim 2 wherein said article is contacted with said vapor in an initial contact zone at a temperature of 200 to 215° C. for a period of 0.1 to 1.0 minutes and then cured at a temperature of from about 205 to 217° C. for a period of about 0.1 to 1.0 minutes, under a tension in both said initial contact zone and said cure zone of from about 0.2 to about 0.3 gram per denier.

5. The process of claim 2 wherein the yarn is preheated prior to contact with said vapor.

6. The process of claim 5 wherein the yarn is preheated to a temperature within at least 50° C. of the reaction temperature.

7. An isocyanate-modified continuous nylon filament produced by the method of claim 20 showing molecular orientation along the filament axis, in which at least 5% of the nylon is insoluble at 22° C. in aqueous 90% formic acid, having tensile modulus at least 20% higher than that of an untreated control filament, retaining at least 70% of the ultimate tensile strength and ultimate elongation of said control filament, having boiling water shrinkage not over 70% of that of said control filament, having primary creep not over 90% of that of said control filament, and having Flat Spot Index not over 80% of that of said control filament.

8. An isocyanate-modified polycaproamide multifilament yarn produced by the method of claim 20 wherein the filaments consist of an outer sking constituting 5%–95% of the cross-sectional area, said outer skin being insoluble at 22° C. in aqueous 90% formic acid, said yarn having initial tensile modulus of 35 to 85 grams per denier and at least 15% greater than that of an untreated control yarn, having a wet tensile modulus at least double that of said control yarn, having a boiling water shrinkage between 4–8%, and having a moisture absorption after 24 hours at 65% relative humidity at least 10% less than the unmodified filament.

9. A toluene diisocyanate-modified poly-e-caproamide multifilament yarn produced by the method of claim 22, in which 5% to 95% of the polycaproamide is insoluble at 22° C. in aqueous 90% formic acid, showing molecular orientation along the filament axis, having tensile modulus of 35 to 85 grams per denier, having ultimate tensile strength of 3 to 11 grams per denier, having ultimate elongation of 10% to 35%, having boiling water shrinkage not above about 8%, having primary creep not above about 1.3%, and having Flat Spot Index of about 7–22.

10. A tensilized cord made from an isocyanate-modified continuous multifilament polycaproamide yarn of claim 9, said yarn having a Flat Spot Index not above 18, said tensilized cord having an ultimate tensile strength of at least 70% of that of a tensilized control cord made from untreated polycaproamide yarn, having an initial tensile modulus at least 15% greater than that of said control having adhesion to rubber substantially that of said control cord, having Flat Spot Index not over 80% of that of said control cord, and having shrinkage at 375° F. at least 10% less than that of said control cord.

11. A mixture of yarns of claim 8 having different proportions of outer skin and having a range of dye affinities from which articles displaying tone on tone dye effects may be produced.

References Cited
UNITED STATES PATENTS 2,935,372    5/1960    Steuber _____ 264—83

GEORGE F. LESMES, Primary Examiner

J. CANNON, Assistant Examiner

U.S. Cl. X.R.

8—14, 21, 55; 57—140; 152—356, 359; 161—173; 264—83

PO-1050
(5/69)

UNITED STATES PATENT OFFICE
CERTIFICATE OF CORRECTION

Patent No. 3,545,911     Dated December 8, 1970

Inventor(s) P. V. Papero, Jr., et al.

It is certified that error appears in the above-identified patent and that said Letters Patent are hereby corrected as shown below:

Claim 7 - line 2, claim "20" should read --1--.

Claim 8 - line 2, claim "20" should read --1--.

Claim 9 - line 2, claim "22" should read --2--.

Claim 8 - line 2, "sking" should read --skin--.

SIGNED AND
SEALED
FEB 23 1971

(SEAL)
Attest:

Edward M. Fletcher, Jr.
Attesting Officer

WILLIAM E. SCHUYLER, JR.
Commissioner of Patents